Sept. 9, 1941.  J. B. STEELMAN  2,255,193
THRESHING APPARATUS
Filed Sept. 3, 1940    3 Sheets-Sheet 1
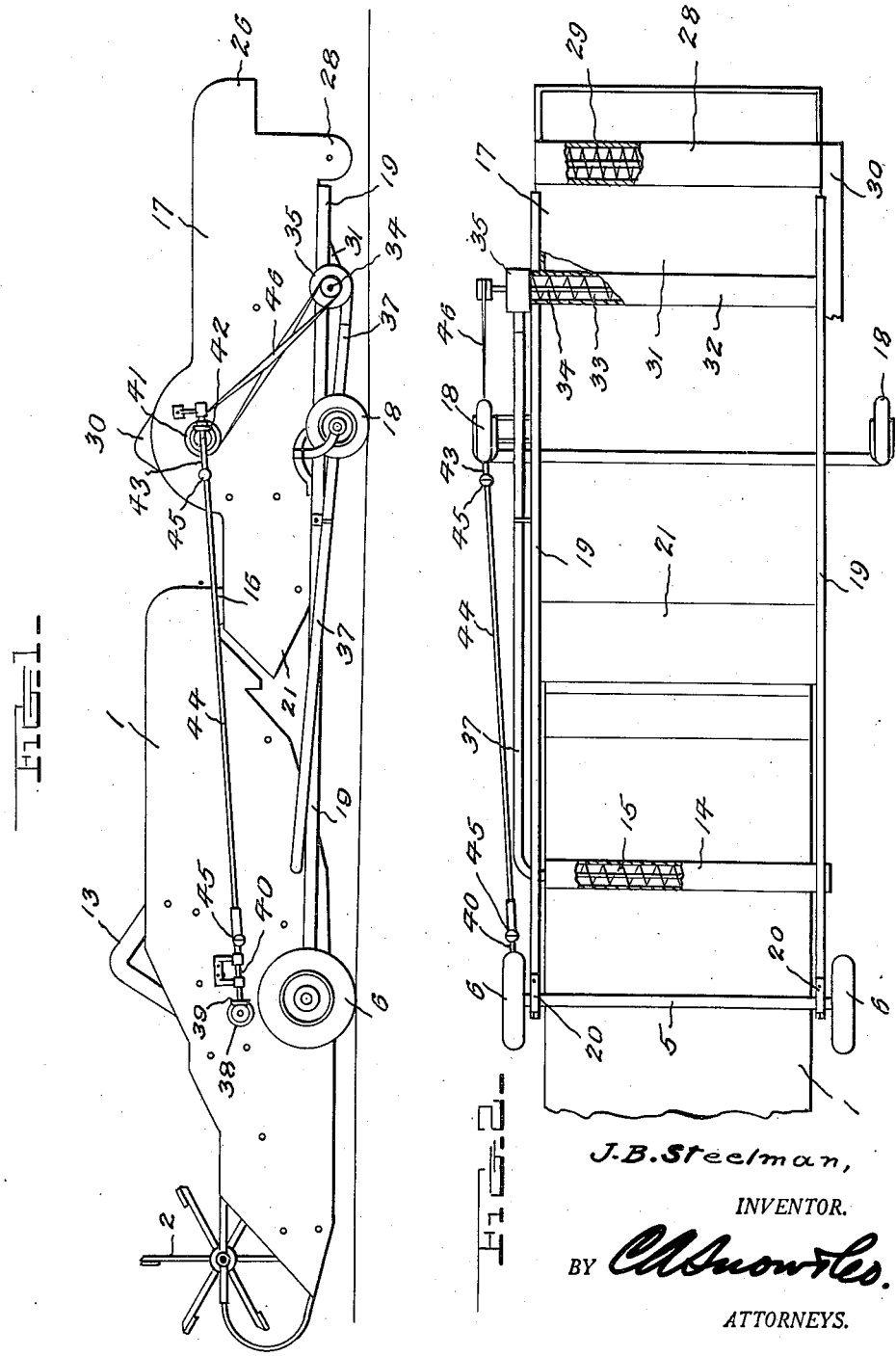
J.B.Steelman,
INVENTOR.
BY CA Knowles
ATTORNEYS.

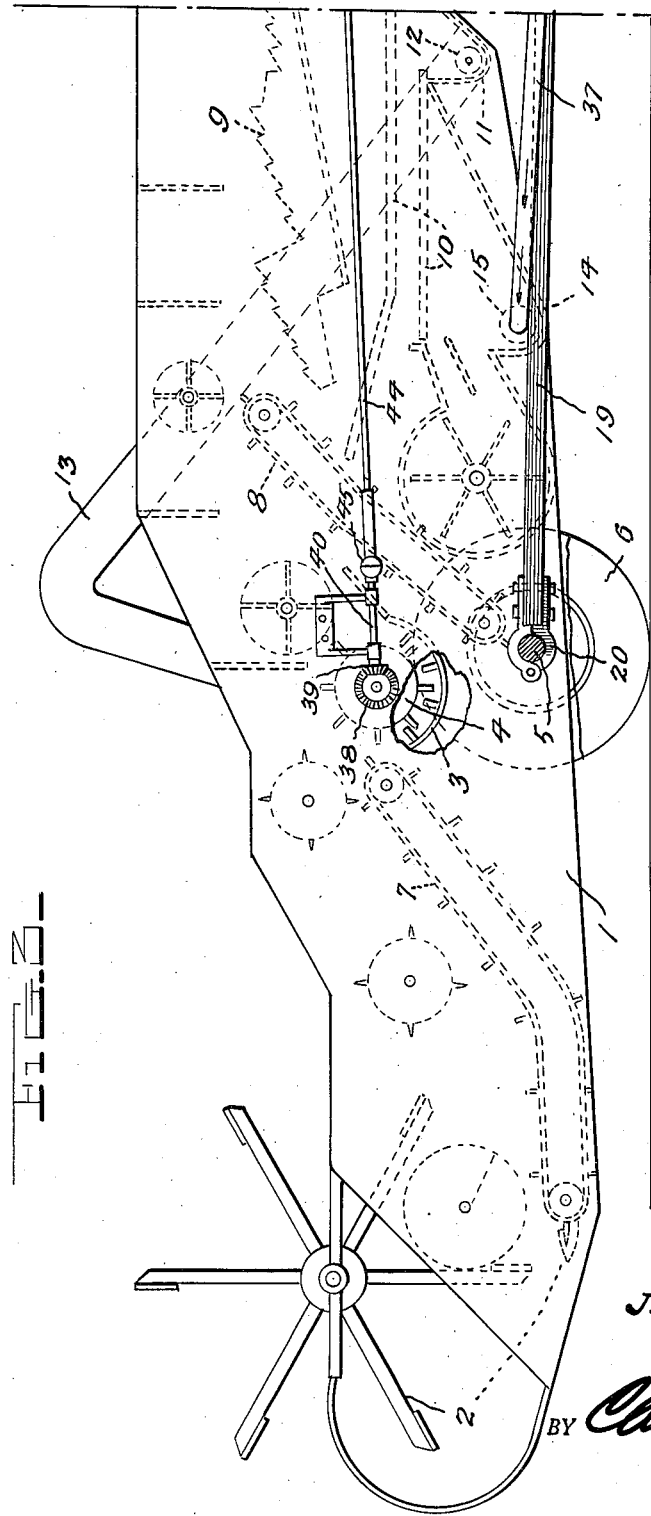

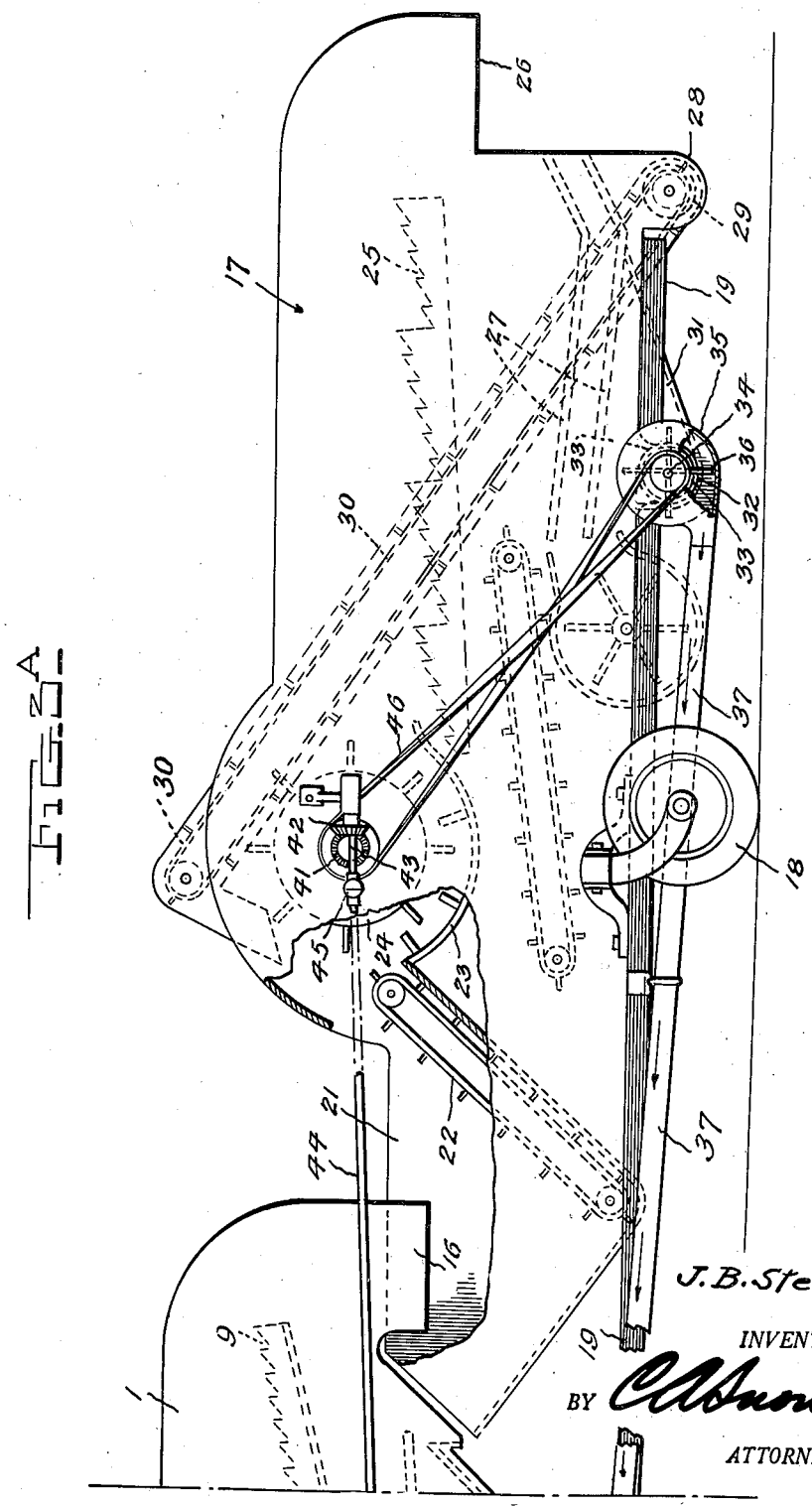

Patented Sept. 9, 1941

2,255,193

UNITED STATES PATENT OFFICE 2,255,193

THRESHING APPARATUS

James Boone Steelman, Fayetteville, Tenn.

Application September 3, 1940, Serial No. 355,255

1 Claim. (Cl. 130—27)

This invention relates to threshing apparatus and more especially to a means for effecting rethreshing of grains and seeds. It is especially useful in threshing crimson and similar clovers.

It is a fact well known to those skilled in the art that a considerable amount of seed or grain is present in the piles of pomace produced by a threshing operation and for the purpose of recovering this material which otherwise would be wasted, it has been the practice generally to collect the pomace, convey it back to the thresher intake and subject the material to another threshing operation in the same machine. The rehandling of the pomace has resulted in loss of seed and there has also been a waste of time resulting from the handling of the material.

An object of the present invention is to provide a secondary threshing mechanism for use with the main thresher, it being possible to combine the same with a thresher of any standard type whereby the pomace, as fast as produced, is directed into the secondary thresher and the seed recovered therein is properly delivered instead of being deposited with other material on the ground for possible further treatment.

Another object is to provide a secondary thresher so connected to the main thresher as to move readily therewith and to be easily disconnected therefrom.

A still further object is to provide a means by which the recovered seed in the supplemental thresher, if desired, can be directed to the elevator of the main thresher for delivery with the seed separated during the initial threshing operation.

With the foregoing and other objects in view which will appear as the description proceeds, the invention consists of certain novel features of construction and combinations of parts hereinafter set forth, it being understood that changes may be made within the scope of the appended claim.

In the accompanying drawings the preferred form of the invention has been shown.

In said drawings

Figure 1 is a side elevation of the complete apparatus.

Figure 2 is an enlarged bottom plan view of a portion thereof, parts being broken away.

Figures 3 and 3ª are views in elevation on an enlarged scale of the complete apparatus, parts being broken away.

Referring to the figures by characters of reference, I designates a threshing machine of any standard type including, in the present instance, a harvesting mechanism 2, a concave 3 and a cylinder 4, the latter being driven in the usual or any preferred manner. The axle 5 is supported by wheels 6 and in addition to a feed belt 7 leading to the concave, there is an elevator belt 8 for conveying material from the concave to the straw walkers 9. These latter overlie the sieves 10 delivering into a trough 11 for tailings. This has the usual worm 12 for directing the tailings to an elevator 13 which returns the tailings to the concave as ordinarily.

A hopper 14 is located beneath the sieves to receive the separated seeds and has the usual delivery means, such as a worm 15 for directing the seed to sacks or other containers properly located. A delivery spout 16 is located where it will receive straw from the walkers.

The structure thus far described is not new but is already embodied in threshers.

The present invention includes a supplemental mechanism including a thresher structure 17 supported by caster wheels 18 and having a bottom frame 19 which extends forwardly from the structure and is coupled to axle 5 by split sleeves 20 whereby a detachable hinge connection is provided and the frame 19 and structure 17 are free to move upwardly and downwardly while trailing thresher 1 but the threshers are held against lateral relative swinging. The casters will properly support the structure 17 when it is moved in any direction with thresher 1.

The structure 17 has an intake hopper 21 located under spout 16 so as to receive straw therefrom. A feed belt 22 is positioned to convey straw from this hopper to the concave 23 for rethreshing by cylinder 24. Straw walkers 25 convey the straw from the concave to an outlet spout 26 and over sieves 27 the tailings of which are delivered into a trough 28.

Seed separated by the sieves gravitates into a hopper 31 having a trough bottom 32 and in the trough is a screw or auger 33 the shaft 34 of which projects at the delivery end of the auger, into a fan casing 35. Here the shaft is provided with a blower 36 for directing seeds from the casing 35 into a flexible pipe 37 leading to the intake end of trough 14. Thus all seed recovered in the main thresher and the supplemental thresher will be discharged at the same point.

The shaft of cylinder 4 can be provided with a gear 38 in mesh with a gear 39 on a shaft 40. A gear 41 can be secured to the shaft of cylinder 24 and is in mesh with a gear 42 on a shaft 43. The shafts 4 and 43 can be operatively connected by a telescopic shaft 44 having universal driving connections with said shafts as shown at 45. Thus the two cylinders will be driven simultaneously and the gears, as shown, can be so proportioned that cylinder 24 will be rotated at a slightly greater speed than cylinder 4.

The blower 36 can be driven in any suitable manner. For example a belt 46 can transmit motion thereto from the shaft of cylinder 24.

In operation the material under treatment is threshed in the usual way by the thresher 1 but instead of delivering the pomace onto the ground for subsequent rehandling, it is fed into the supplemental thresher 17 where it is treated as already explained and most of the seed which otherwise would be lost is recovered and sacked.

The two threshing mechanisms operate as one structure. The connecting means therebetween and the caster wheels permit ease of movement over a field. The flexible pipe 37 does not interfere with such movement.

As the various drive mechanisms form no part of the present invention but are of the usual or any preferred construction, they have not been shown or described.

By driving cylinder 24 at a slightly greater speed than cylinder 4, there is no danger of choking because the material in concave 23 will thus be disposed of as fast as it is supplied thereto.

What is claimed is:

In threshing apparatus the combination with a main thresher including a cylinder and concave and having a straw outlet and a grain hopper and outlet, and a wheel-supported axle for the main thresher, of a supplemental thresher hingedly connected to the axle for up and down swinging movement, said supplemental thresher being held against lateral swinging movement relative to the main thresher, a supporting caster connected to the supplemental thresher, said supplemental thresher including a hopper positioned to receive straw from the outlet of the main thresher, said hopper surrounding the straw outlet and said outlet opening downwardly into the hopper, said supplemental thresher including a cylinder and a concave, means in the supplemental thresher for elevating material from said hopper to the concave, said supplemental thresher having a grain outlet, a tubular flexible connection between said grain outlet and the grain hopper of the main thresher, means for forcing grain from said outlet through the connection to the grain hopper of the main thresher, and means operating independently of the relative movement of the threshers for transmitting motion between the cylinders.

JAMES BOONE STEELMAN.